March 22, 1927. 1,622,173
T. R. BEAN ET AL
MEANS FOR UTILIZING WAVE MOTION FOR THE PROPULSION OF
SHIPS AND THEIR AUXILIARY MACHINERY
Filed Oct. 9, 1926
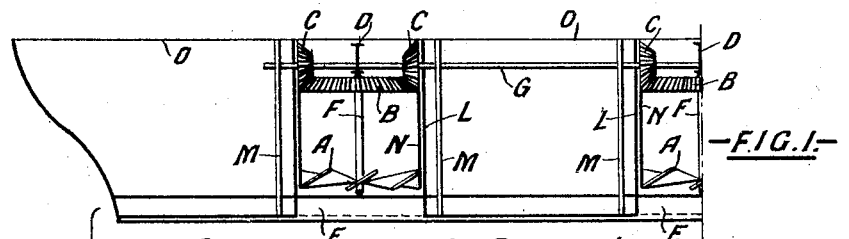
FIG.1.
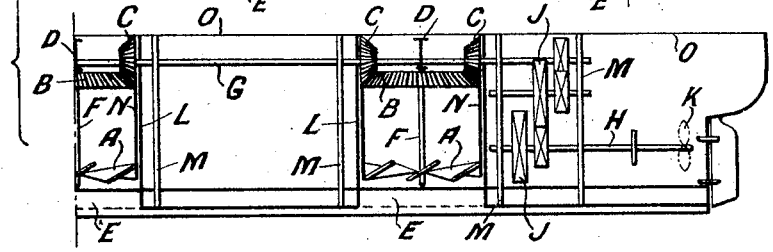
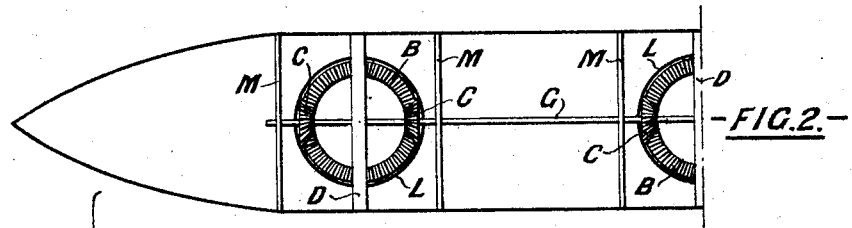
FIG.2.
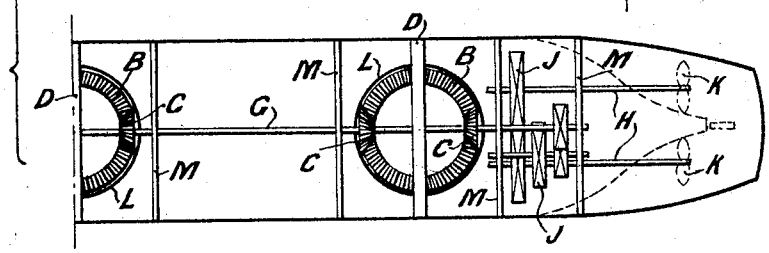
FIG.3.
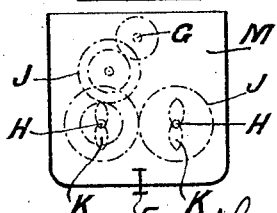
Inventors
Thomas Richard Bean
and
Ralph Elias Sanderin
By P. Singer, atty.

Patented Mar. 22, 1927.

1,622,173

UNITED STATES PATENT OFFICE.

THOMAS RICHARD BEAN, OF GUERNSEY, CHANNEL ISLANDS, AND RALPH ELIAS TAUDEVIN, OF WELWYN, HERTFORD, ENGLAND.

MEANS FOR UTILIZING WAVE MOTION FOR THE PROPULSION OF SHIPS AND THEIR AUXILIARY MACHINERY.

Application filed October 9, 1926, Serial No. 140,629, and in Great Britain October 20, 1925.

The present invention has for its object to provide means utilizing the motion of the waves and the kinetic energy of a ship in its rising and falling movements for propelling the ship and driving its auxiliary machinery.

In carrying the invention into practical effect water turbines enclosed in cylinders are arranged in the ship in such manner as to operate in response to the relative vertical movements of the water and the ship and the oscillatory movements of the turbines are transformed into continuous rotary motion for application to the ship's screws or auxiliary machinery. The auxiliary machinery may include electrical generating plant and storage batteries and these may be so operated that the ship when at sea stores by means of the batteries the surplus energy derived from the turbines, such surplus being available if required for propelling the ship in harbours, rivers or other becalmed waters or for other purposes. As the working of the plant described is dependent upon a certain undulation of the water or oscillatory motion in the ship it is preferable to provide an auxiliary prime mover for use when the water turbines are inoperative.

The invention is hereinafter more fully explained with reference to the accompanying drawing wherein:—

Figure 1 is a longitudinal section of a ship showing diagrammatically one form of construction of this invention, Figure 2 is a plan of the same, and Figure 3 is a transverse section of the same.

As may be seen the ship is built with one or more cylindrical casings L which preferably extend vertically through the hull and communicate through the bottom with the sea, whilst the upper ends thereof are sufficiently high to prevent the water entering the ship. Mounted in each casing for rotary oscillation about a vertical axis is a turbine comprising a vane wheel A attached to a cylinder or drum N and a shaft F which connects the turbine with a toothed crown wheel B. The turbines may be supported by bearings mounted on the keel E and transverse girders D respectively.

A power transmission shaft G extending longitudinally of the ship carries pairs of toothed pinions C which mesh with the crown wheels B and are provided with oppositely arranged ratchet or free wheel gears by means of which oscillatory motion of the crown wheel is converted into uni-directional rotary motion in the shaft G. This power shaft is preferably supported in bearings carried by the iron bulk-heads M extending transversely of the ship below the deck O.

Any suitable speed multiplication gearing as that shown at J with means for coupling and reversing as required may be used for transmitting energy from the power shaft G to the shafts H of the propelling screws K, and other gearing not indicated may be provided for transmitting power from the shaft G to any auxiliary machinery such as electricity generating plant, pumps, machine tools or the like.

As will be understood, with the ship at sea, the wave motion and the vertical movements of the ship will cause the sea water to surge into and out of the casings L and so set the turbines into rotary oscillatory motion. By reason of the crown wheels B, the pinions C and their free wheel or ratchet drives this motion is transmitted to the shaft G as a uni-directional rotary motion suitable for driving the propelling and other machinery on the ship.

The mechanism operatively connecting the turbines with the driven machinery may of course be modified in various ways provided that the free wheel or ratchet drive devices are retained for converting the oscillatory motion into continuous, uni-directional motion. For example the pinions with ratchet drive may in some cases be arranged upon the turbine shafts and made to engage diametrically opposed points on crown wheels carried by the power shaft extending longitudinally of the ship.

As the energy made available by this means is entirely dependent upon a certain relative vertical motion of the ship and the water it is of course desirable to provide some stand-by prime mover which may be coupled to the power shaft when the turbines are inoperative or developing insufficient power for the needs of the moment.

We claim:—

1. Means for utilizing the motion of the waves and the kinetic energy of the ship's mass in the propulsion of a ship comprising water turbines arranged in the ship's hull and oscillated by the rise and fall of water therein and means transforming said oscillation into uni-directional rotary motion for driving the ship's propeller.

2. Means for utilizing the motion of the waves and the kinetic energy of the ship's mass in the propulsion of a ship comprising vertical cylinders in the ship's hull and open to the sea at the base, turbines in the cylinders arranged to oscillate in response to the rise and fall of water in said cylinders, free wheel drive mechanism for converting the oscillation of the turbines into continuous rotation of a power shaft, and means operatively connecting the power shaft with the propellers and auxiliary machinery as required.

3. Means for utilizing the motion of the waves and the kinetic energy of a ship's mass for the propulsion of the ship according to claim 1, including in addition electricity generating and storage plant for absorbing surplus energy when the ship is at sea for subsequent use as when in calm water.

4. Means for utilizing the motion of the waves and the kinetic energy of a ship's mass for the propulsion of the ship according to claim 1, including in addition a stand by prime mover for use when the water turbines develop insufficient power for the requirements of the ship.

5. Means for utilizing the motion of the waves and the kinetic energy of a ship's mass for the propulsion of the ship according to claim 1, in which the power shaft is geared by belts, pulleys or toothed wheels to machine tools, pumps or other auxiliary machines.

In testimony whereof they have affixed their signatures.

THOMAS RICHARD BEAN.
RALPH ELIAS TAUDEVIN.